United States Patent [19]

Davis

[11] Patent Number: 5,788,254
[45] Date of Patent: Aug. 4, 1998

[54] PEDAL POWERED VEHICLE

[76] Inventor: John Davis, 904 W. 23rd, Yankton, S. Dak. 57078

[21] Appl. No.: 835,001

[22] Filed: Apr. 7, 1997

[51] Int. Cl.⁶ .................................................. B62K 5/06
[52] U.S. Cl. .......................... 280/282; 280/279; 280/288.3; 280/261; 280/DIG. 6; 475/230; 301/64.7; 301/105.1
[58] Field of Search .......................... 280/282, DIG. 6, 280/279, 152.3, 852, 288.3, 288.1, 261, DIG. 5, 259, 260; 188/24.17; 301/64.7, 105.1, 111; 475/230

[56] References Cited

U.S. PATENT DOCUMENTS

| 508,782 | 11/1893 | Taintor | 280/152.3 |
| 805,740 | 11/1905 | Lowe | 475/230 |
| 1,544,805 | 7/1925 | Celander | 475/230 |
| 3,785,676 | 1/1974 | Klein, Jr. | 280/279 |
| 4,447,093 | 5/1984 | Cunard et al. | 301/63 |
| 4,573,549 | 3/1986 | Pankow | 180/216 |
| 4,826,190 | 5/1989 | Hartmann | 280/236 |
| 5,337,861 | 8/1994 | Romano | 188/24.17 |
| 5,484,152 | 1/1996 | Nunes et al. | 280/282 |

*Primary Examiner*—Anne Marie Boehler
*Assistant Examiner*—Michael Cuff
*Attorney, Agent, or Firm*—D. L. Tschida

[57] ABSTRACT

A light weight, stowable golf cart powered by a pedaled drive train. An enclosed box frame supports three extra wide, non-pneumatic tires which are pedal powered through a push button controlled, multi-speed transmission and separate endless chain and belt drive linkages. A rear differential transfers drive power to split rear axles and the rear wheels to enhance maneuverability. Fabric fenders mount over the rear wheels. A fabric semi-recumbant seat and bag support adjust fore and aft along a railed track. A tiller handle mounts to a head tube containing pre-mounted bearings. Cable controlled front caliper brakes mount to a front fork and wheel. Foot controlled brakes operate through the multi-speed transmission. The cart disassembles for shipping, storage and transport.

17 Claims, 7 Drawing Sheets

PEDAL POWERED VEHICLE

BACKGROUND OF THE INVENTION

The present invention relates to pedal powered vehicles and, in particular, to a three wheeled, rear wheel drive vehicle with a differential drive assembly. In a presently preferred construction, a golf cart is disclosed.

With the aging of the "baby boom" populations in many countries and expanding concerns for personal fitness, the cycling sports and golf have grown and continue to grow in popularity over recent past. Individuals of all skill levels variously participate in each of the sports, whether on a casual basis or with fanatic enthusiasm. Numerous pedaled vehicles have been developed to accommodate these individuals.

As regards golf, individual preferences, economics, course restrictions and age effect decisions to the mode of player and equipment transport. Many walk and carry their own clubs, while many rent or own motorized carts or hire caddies to carry their equipment.

For those desiring exercise with the convenience of a cart, pedal powered carts have been developed. One such cart is shown at U.S. Pat. No. 4,792,149 and wherein a pedal powered drive shaft operates through a transmission. Another cart is shown at U.S. Pat. No. 5,312,126 which discloses a four wheeled, chain driven cart.

A variety of other pedal powered, chain driven, multi-wheel personal transport vehicles also exist. U.S. Pat. Nos. 4,451,064 and 4,674,762 disclose a pair of vehicles having rear wheels driven by a single chain, which vehicles consequently suffer from turning disabilities which arise when the drive power is concentrated on one side or wheel of the vehicle. U.S. Pat. No. 4,456,277 discloses a front wheel drive vehicle which includes a pedal prow mounted forward of the front wheels. U.S. Pat. No. 4,826,190 discloses a vehicle with a central transmission and one-way clutches at each of a pair of driven rear wheels. U.S. Pat. No. 5,486,015 discloses a front wheel, gear driven vehicle. The foregoing vehicles are principally constructed for personal transport and use on paved surfaces versus travel over turf and a variety of non-uniform ground conditions, such as encountered with off-road use, for example on a golf course.

The subject invention was developed to provide a vehicle which accommodates cyclists and golfers who desire personal exercise, yet which travels with relative ease over both paved surfaces and turf and without damaging the turf. The cart also disassembles with relative ease to stow for shipping, storage or within a car or other transport vehicle.

SUMMARY OF THE INVENTION

It is a primary object of the present invention to provide a pedal powered vehicle adapted to movement over unpaved surfaces for transporting personnel and equipment, for example, golf bags.

It is a further object of the invention to provide a rear wheel driven vehicle having a differential assembly that permits differential rotation of the rear wheels to accommodate sharp turns.

It is a further object of the invention to provide a rear wheel driven vehicle having a low center of gravity and a wide foot print and relatively large weight displacement at the support wheels.

It is a further object of the invention to provide a vehicle having separate chain and belt drive linkages which cooperate to couple drive power to a rear differential assembly and a pair of rear axles.

It is a further object of the invention to provide a vehicle having a framework which encloses the drive linkage.

It is a further object of the invention to provide a steering assembly having pre-mounted bearings and a handle which disassembles from a support column.

It is a further object of the invention to provide a vehicle having a stretched fabric seat and fenders.

It is a further object of the invention to provide hand and foot controlled brake systems to the front and rear wheels.

Various of the foregoing objects, advantages and distinctions of the invention are obtained in a presently preferred vehicle which is described in detail with respect to the appended drawings. The vehicle is constructed about a welded aluminum box frame which supports a front fork and wheel and a pair of driven rear wheels. A tiller handle steers the front wheel through a head tube assembly which contains pre-mounted bearings in the tube column.

Encased within the frame and accessible from removeable panels are a pedal crank assembly and chain which cooperate with a seven speed transmission. Gear selection is controlled with a push button operated cable. A cogged drive belt transfers power and foot applied braking forces from the transmission to an annular or ring gear at a rear differential. The ring gear surrounds mitered drive and pinion gears supported to a yoke within the ring gear to transfer power to a pair of split axles and quick release mounted rear wheels. Non-pneumatic, extra wide or high flotation tires are supported to plastic spoke rims.

A fabric seat and fabric fenders are stretched over tubular subframes. The seat adjusts along a flanged slide rail at the frame and a golf bag support follows to vary the bag position. Cable operated caliper brakes couple to the front wheel. A canopy, drink holders and other accessories mount to the frame.

Still other objects, advantages and distinctions of the invention are disclosed in the following description with respect to the appended drawings. Similar components and assemblies at the various drawings are referred to with the same reference characters and numerals. Various considered modifications and improvements are also described as appropriate. The description should not be strictly construed in limitation of the invention, which rather should be broadly construed and interpreted within the scope of the appended claims.

DESCRIPTION OF THE PREFERRED EMBODIMENTS

Figure 1:
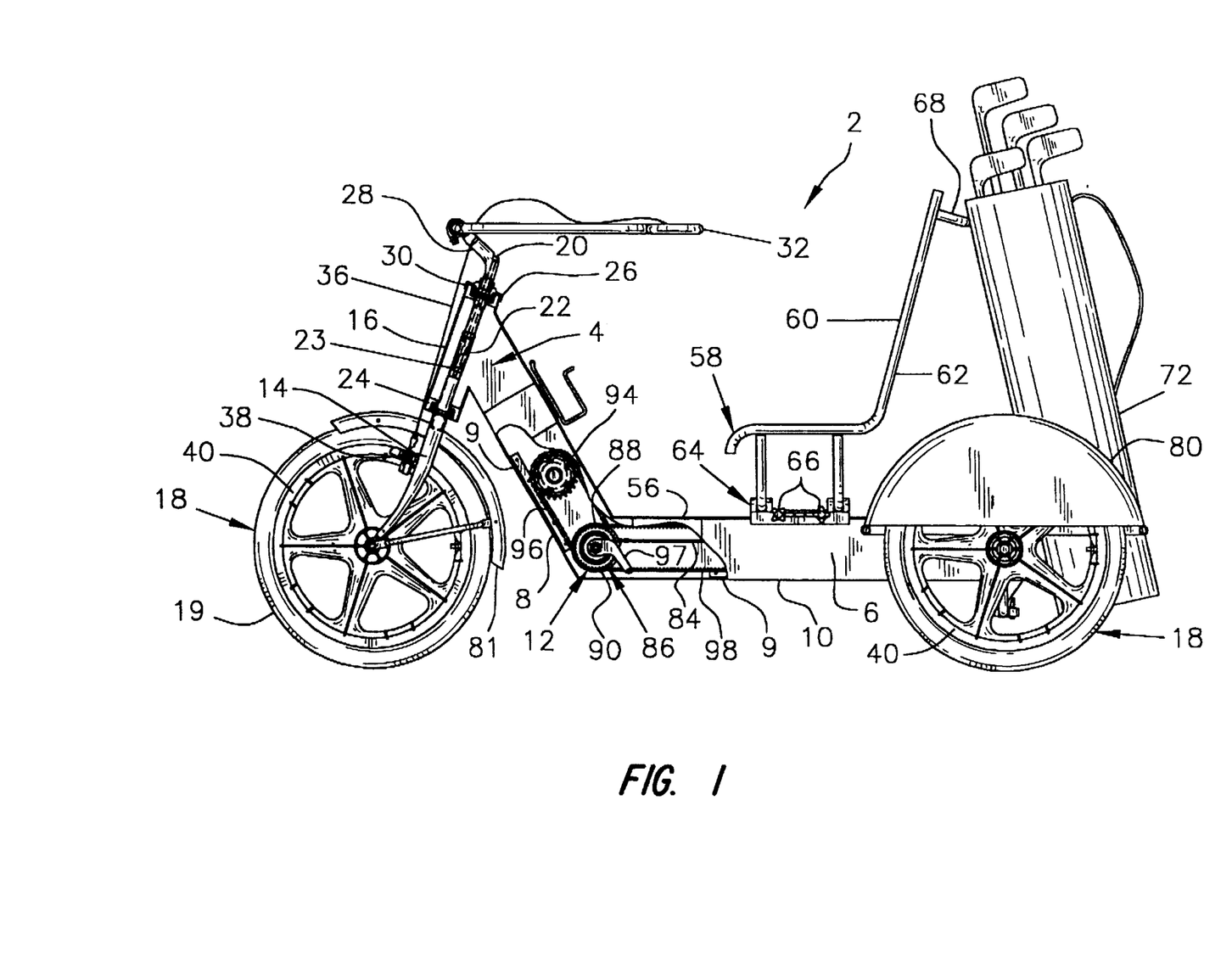
FIG. 1 is a side elevation drawing shown in partial cutaway to a pedal powered golf cart.
Figure 2:
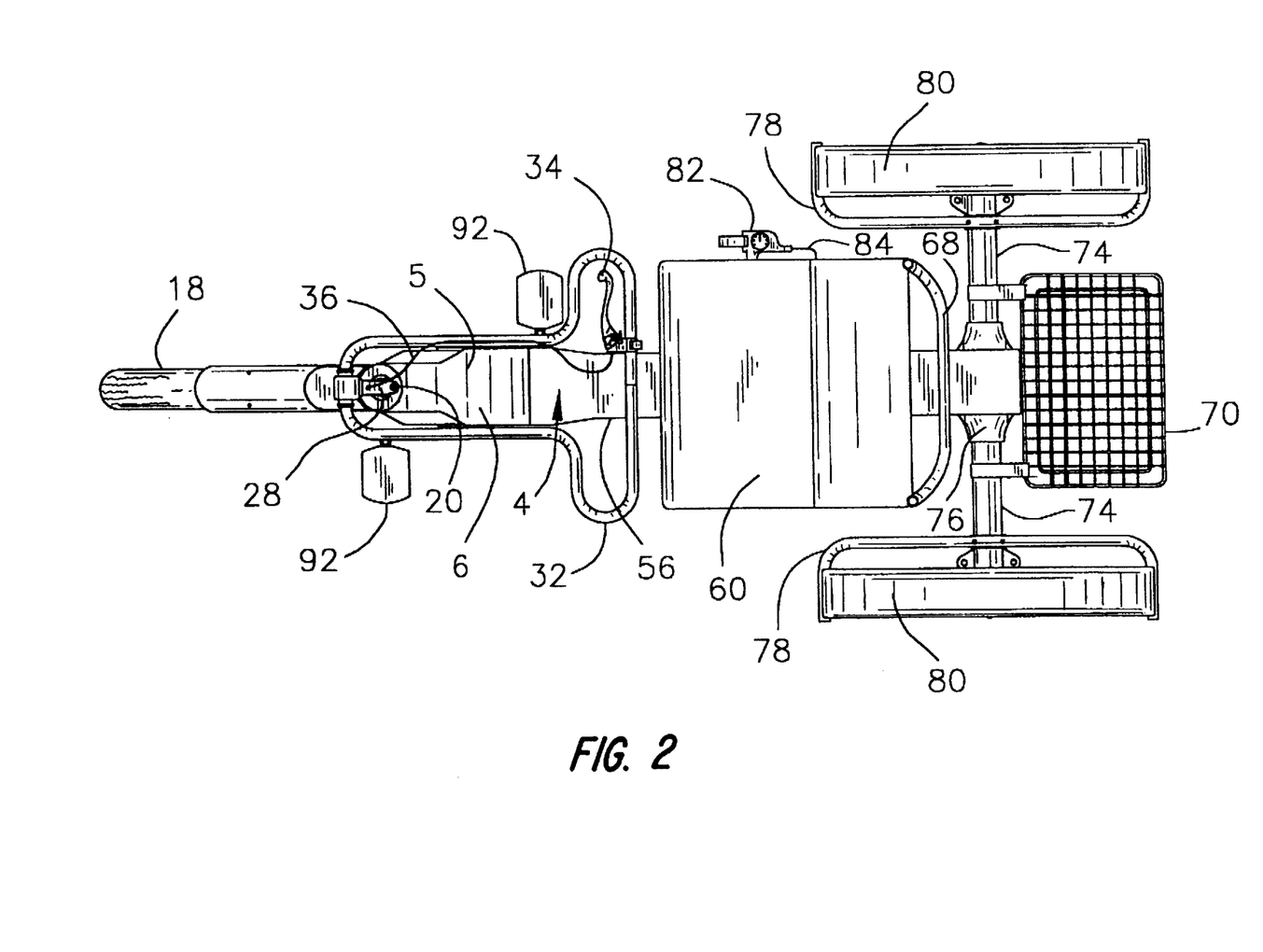
FIG. 2 is a top view of the golf cart of FIG. 1.
Figure 3:
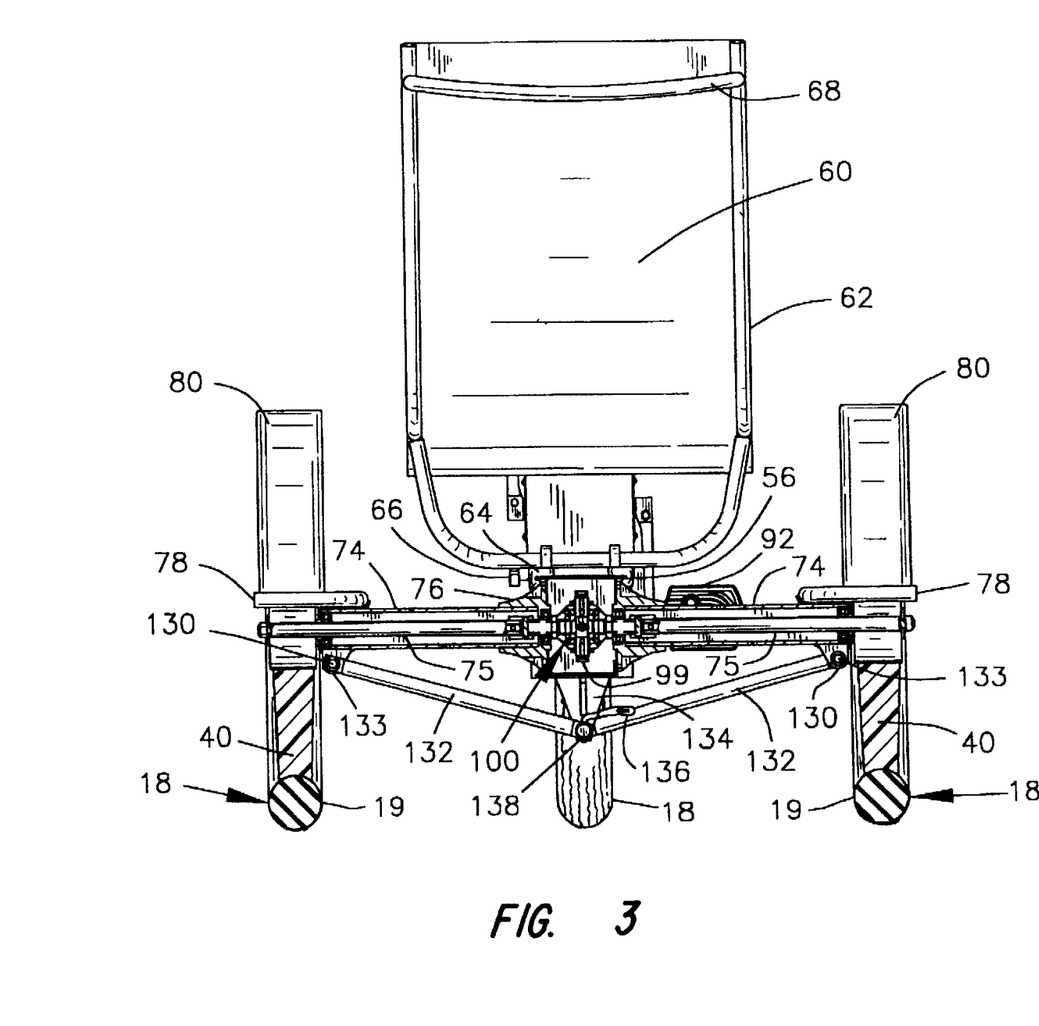
FIG. 3 is a rear view shown in partial cutaway at the rear differential and axle of the golf cart of FIG. 1.

Referring to FIGS. 1 through 3, elevation drawings are shown in partial cutaway to a pedal powered, three wheeled golf cart 2 of the invention. The cart 2 is constructed about an aluminum box frame 4. The frame 4 includes a pair of full length primary panels 5 and 6 which are fastened together by welding. Access covers 8 and 10 are fastened with removeable fasteners to angle brackets 9 within the frame 4, along an inclined front surface and the bottom surface of the frame 4, to permit access to an internal drive linkage 12 for repairs and parts replacement.

A pair of wheels 18 of identical construction are fitted to the rear end of the frame 4. The wheels 18 include non-pneumatic tires 19 which present a wide foot print and relatively high degree of flotation or weight displacement to broadly distribute vehicle and occupant weight and minimize rutting on unpaved surfaces.

The wheels 18 are presently sized at a 20 inch diameter and the tires 19 exhibit a width of approximately three inches, which is substantially wider than other available bicycle type wheels. Each wheel thereby presents a larger foot print and is able to displace greater weight. Pneumatic wheels might be adapted to the vehicle, however, at greater cost and would require extensive modification of the steering fork 14. Potential rutting and loss of drive power are avoided with the wheels 18.

Figure 4:
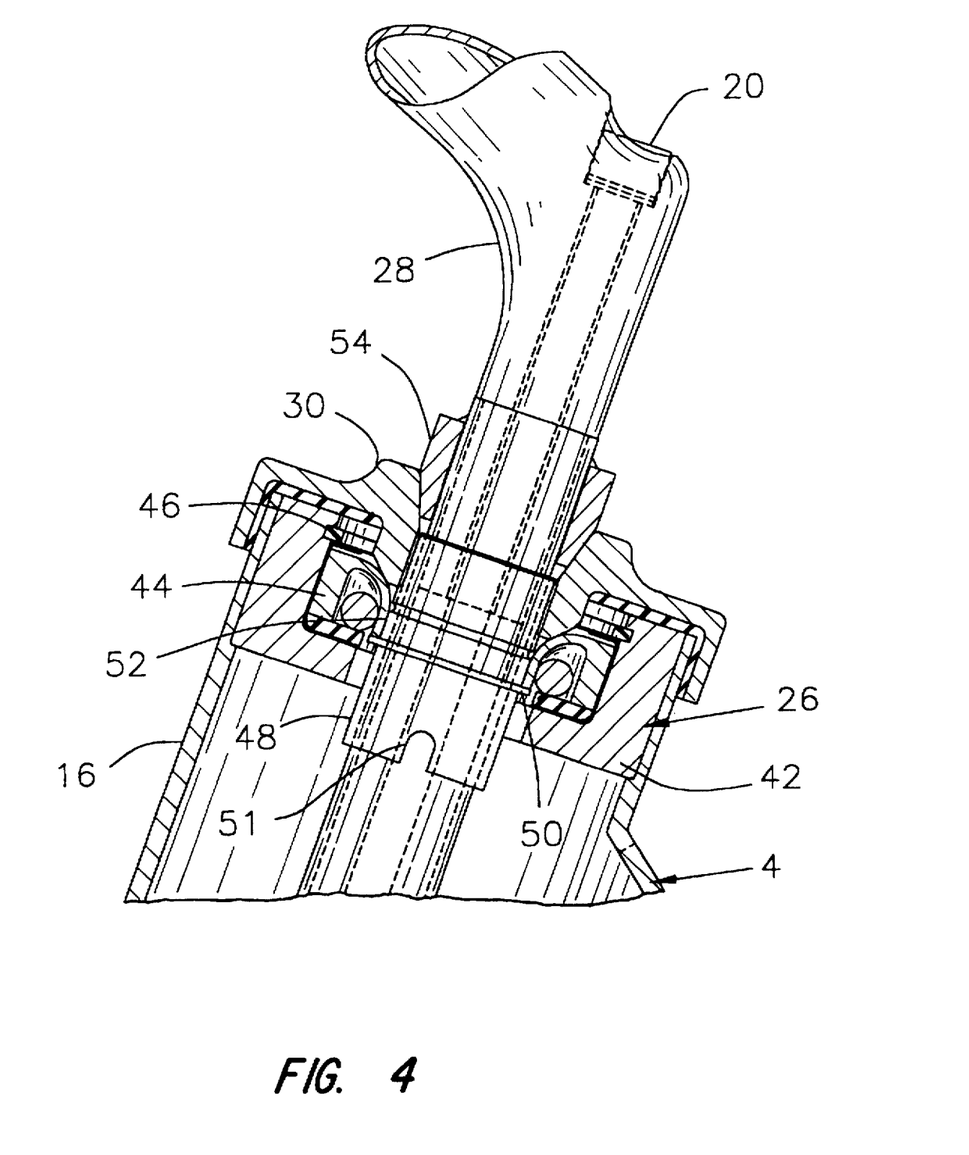
FIG. 4 is a section drawing through the steering head tube of cart.

Mounted to a head tube 16 of the frame 4 is the steering fork 14 and which supports the front wheel 18 in conventional fashion. The fork 14 is of generally conventional construction and is retained within the head tube 16 with a stem bolt 20 at a pair of mating tapered draw couplers 22 that slide within the tube 16. A novel caged bearing 24 mounts to a lower end of the tube 16 and a novel pre-loaded bearing assembly 26, reference FIG. 4, is fitted to the upper end of the tube 16 to support the fork 14. The bearing assembly 26 is factory adjusted to avoid possible adjustment deficiencies that can result from numerous stowing and assembly operations of the vehicle 2 by an uninitiated user.

A stem yoke 28 extends from the head tube 16 at a sleeve nut 30 and supports a tiller handle 32. The tiller handle 32 controls steering. Alternative types and styles of handles 32 can be fitted to the yoke 28.

Braking of the front wheel 18 is effected through a hand brake lever 34 and cable 36, which is strung along the handle 32 and head tube 16 to a conventional caliper brake assembly 38. The brake assembly 38 is mounted to the fork 14 to contact the opposite sides of the rim 40 of the wheel 18. The wheel 18 provides a plastic rim 40, which is presently preferred due to its light weight. Conventional metal spoke rims or composite rims might also be used, depending upon desired durability.

With additional attention to FIG. 4, the sealed bearing assembly 26 is mounted to the head tube 16 to assure proper alignment and adjustment of the front steering assembly, regardless of any repeated assembly and stowage of the vehicle 2. Once mounted to the head tube 16, the assembly 26 is normally not adjusted by the user. The stem yoke 28 is merely inserted and withdrawn from the sleeve nut 30.

The assembly 26 includes a press fit retainer cup 42 which supports a caged bearing 44. The bearing 44 is held in place with a snap ring 46. A sleeve bushing 48 is threaded to the sleeve nut 30 and centered at the bearing 44. The bushing 48 is situated with a tool that extends through the bushing 48 and mounts to a notch 51 to permit rotation. A snap ring 50 locks the bushing 48 to the inside race 52 of the bearing 44.

Once the assembly 26 is secured to the head tube 16, thereafter, it is necessary to only mount the stem 28 to the sleeve nut 30 and tighten the stem bolt 20. A tapered collar 54 is then drawn into contact with a mating tapered surface of the sleeve nut 30, as the stem bolt 20 is tightened, to retain the yoke 28 with proper steering free play.

Returning attention to FIGS. 1 and 2, extending along the top of the frame 4 is a flanged rail 56 and to which a sling type seat assembly 58 is secured. The assembly 58 includes a stretched fabric seat 60 which is supported with VELCRO fasteners to a formed tubular frame 62. A slide cradle 64 retains the seat frame 62 at a desired location along the rail 56 and the frame 4, upon tightening hand nuts 66, which clamp the cradle 64 to the rail 56. A golf bag support rail 68 at the back of the seat frame 62 holds the upper end of a golf bag 72. A platform 70, mounted to the end of the frame 4, supports a lower end of the golf bag 72. The angle of tilt at the golf bag 72 varies depending upon the mounting position established for the cradle 64 along the rail 56. Other types of accessory brackets can be mounted to the seat 60 or frame 4 to accommodate different recreational activities.

Figure 5:
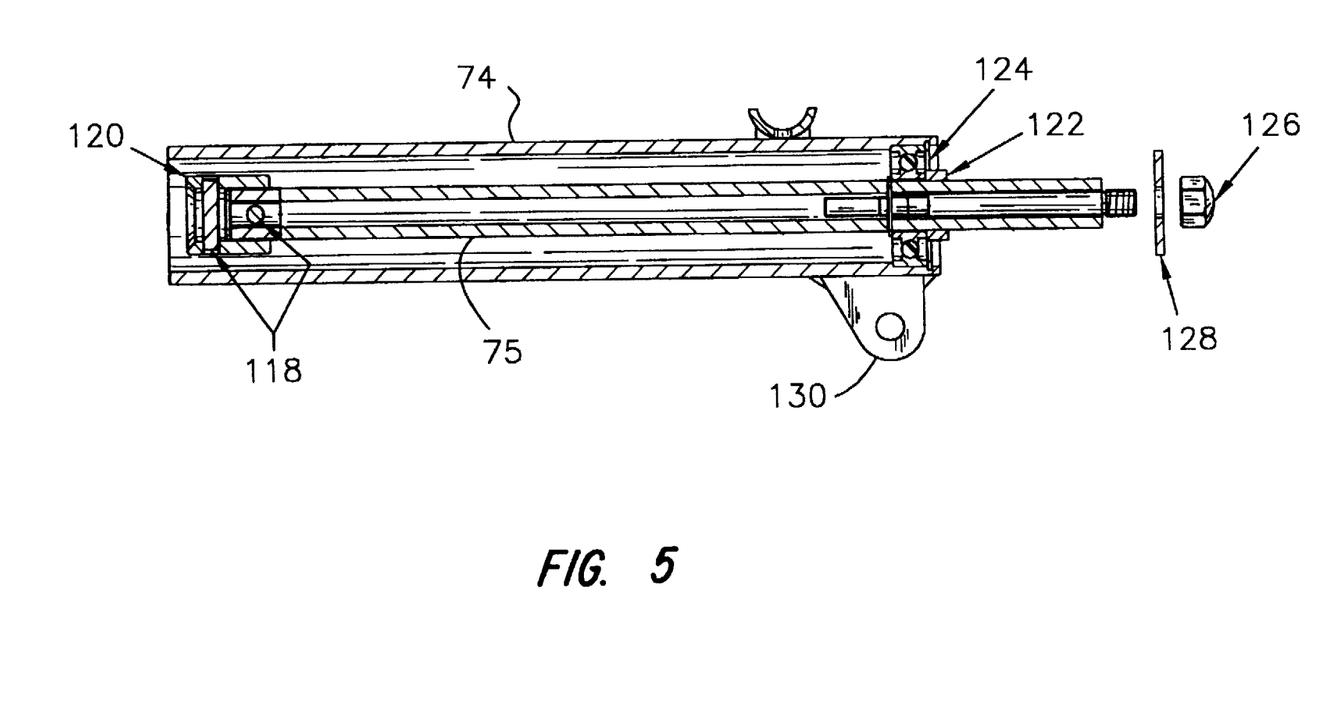
FIG. 5 is a section view through the rear axle assembly.

With additional attention to FIGS. 3 and 5, a pair of tubular axle housings 74, which contain a pair of hexagon axles 75, laterally extend from flanges 76 that project to either side at the aft end of the frame 4 to support the rear wheels 18. Tubular frames 78 are secured to the axle housings 74 and fabric fenders 80 are stretched over fiberglass struts that extend from the frames 78 and over the wheels 18. The fenders 80 are fastened to the frames 78 with snap fasteners. A conventional metal fender is secured to the front wheel 18.

A conventional push button shifter 82 extends from the seat frame 62 and a cable 84 transfers shift selections to the drive linkage 12. The drive linkage 12 includes a multi-speed transmission 86 which is supported within the frame 4. A modified seven speed transmission 86 having an internal planetary gear system is presently used, although a variety of transmissions other speed selections and gear ratios might also be used to advantage. An input chain sprocket 88 mounts to an input shaft and a cogged belt output sprocket 90 mounts to an output shaft of the transmission 86. Power is applied from a pair of pedals 92, crank assembly 94, see also FIG. 6, and a chain 96 mounted above the transmission 86 and within the frame 4. A cogged belt 98 transfers the power from the output sprocket 90 to an annular ring sprocket 99 at the rear differential assembly 100, see also FIG. 7.

Figure 6:
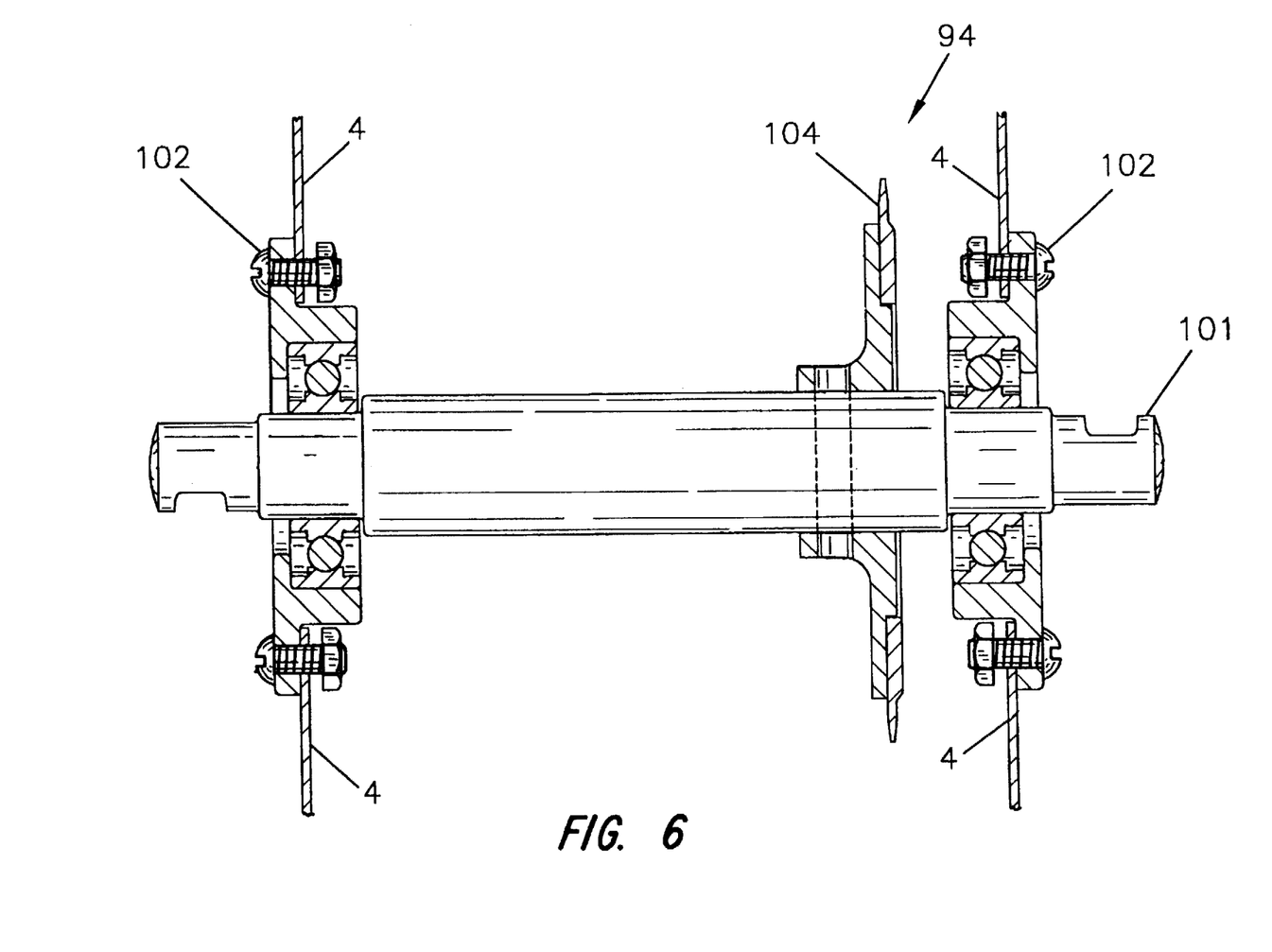
FIG. 6 is a rear view of the pedal crank assembly.

The crank assembly 94 shown at FIG. 6 includes a crank axle 101 which is supported to the frame 4 between a pair of bearing assemblies 102 that are fastened to the walls of the frame 4. A sprocket 104 is pinned to the axle 101 and the chain 96 is trained about the sprockets 88 and 104. Rotation of the pedals 92 transfers power to the chain and transmission 86.

A conventional brake assembly 97, reference FIG. 1, is incorporated into the transmission 86. Upon pedaling backward, approximately 30 degrees, a braking force is applied by the transmission 86 to the belt 98, the differential assembly 100 mounted in the frame 4 and the rear wheels 18. Depending upon surface conditions, a user can access either or both of the front and rear brakes 38 and 97.

With the transfer of power from the transmission 86 to the cogged belt 98, the belt 98 induces the ring sprocket 99 at the differential assembly 100 to rotate. A cast yoke 106 mounted within the center of and secured to the sprocket 99, in turn, rotates, reference FIG. 7. The yoke 106 supports a pair of mitered drive gears 108, which are mounted to sleeve bearings 110, at two of six yoke arms 109 that radially extend within the sprocket 99. Threaded fasteners (not shown) secure the arms 109 to the sprocket 99. A pair of yoke arms 111, that extend transverse to the plane of the sprocket 99, support mitered pinion gears 112 from other sleeve bearings 110. Stub shafts 114 extend from the pinion gears 112 and are supported in bearings 116 fitted to the flanges 76.

Figure 7:
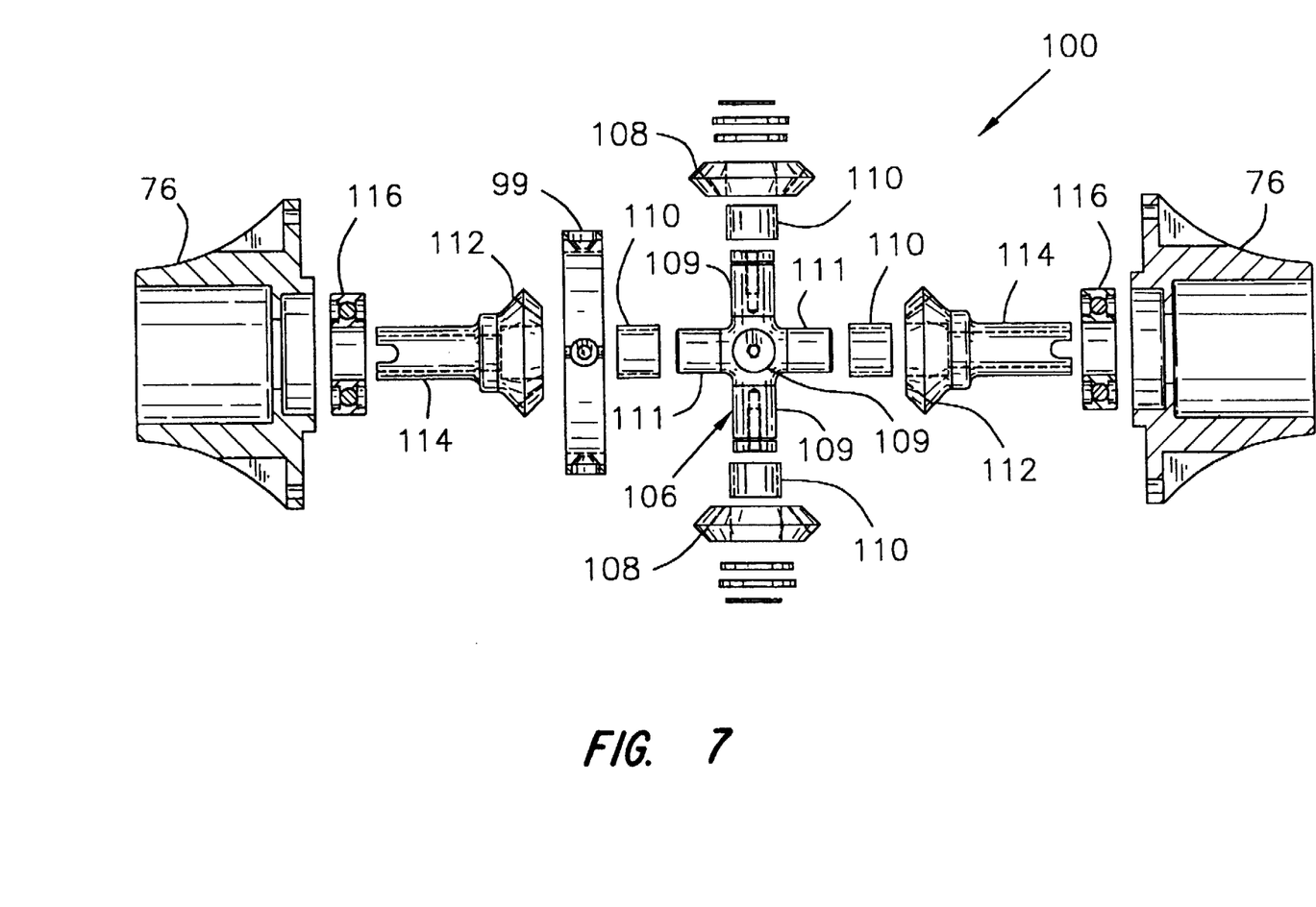
FIG. 7 is an exploded assembly drawing of the rear differential.

The ring sprocket 99 and gears 108 and 112 rotate as an assembly when the vehicle 2 travels in a straight line. Equal torque is then applied by the differential assembly 100 to the left and right wheels 18. When turning, the gears 108 and 112 rotate about the sleeve bearings 110 at appropriate rates to provide different rates of rotation to the axles 75 to permit turns without scuffing or drag at the wheels 18. Ninety degree right or left turns are particularly made possible by the differential assembly 100, when only the corresponding outside wheel 18 is driven and the inside wheel 18 is held stationary.

The differential assembly 100 greatly enhances the utility of the vehicle 2 and facilitates off-road travel under wet and dry conditions. Chain driven vehicles, in contrast, and when driven on only one side, turn efficiently in only one direction, i.e. the chain side. The vehicle also tends to pull to the chain side under high torque situations, such as when climbing a hill. Even vehicles with free wheel assemblies mounted to both sides of the vehicle are not able to adjust and provide the proper relative rotation necessary to effect smooth turns. Typically, only wide, large radius turns are possible, not the ninety degree turns made possible with the vehicle 2.

The stub shafts 114 are secured to the axles 75 with pins 118 at a coupler 120 supported within each of the axle tubes 74, reference FIG. 5. A notch in the inner end of each stub shaft 114 mates with the inner pins 118 of each coupler 120. Each axle 75 is thus removeable upon sliding the axle from its mating coupler 120.

Each axle 75 extends from one of the couplers 120 and is supported at an end spacer 122 and end bearing 124. The axles 75 mount to the rear wheels 18 at hexagon bores at the rims 40 and are retained with a castellated nut 126 and washer 128.

A bracket 130 depends from each axle housing 74 and accepts one end of a support arm 132 at a fastener 133. Each arm 132 extends to a separate bracket 134 that depends from the frame 4, beneath the differential assembly 100, reference FIG. 3. A hand operated threaded release 136 secures the ends of the arms 132 to a center weldment 138. The arms 132 stabilize the rear wheels 18 against bumps and normal ground undulations. Pneumatic pistons, shock absorbers or other resilient suspensions might be substituted or combined with the arms 132.

With the loosening of the release 136 and detachment of the arms 132 from the weldment 138, the axle tubes 74 disengage from the flanges 76 and the axles 75 disengage from the couplers 120. With the dismounting of the tiller handle 32 from the yoke 28 and detachment of the fork from the head tube 16, the cart 2 disassembles into four major components, which can be stored for transport.

While the invention has been described with respect to a presently preferred construction, it is to be appreciated still other constructions may be suggested to those skilled in the art. Other modifications and improvements in addition to those mentioned might also be incorporated into the vehicle. For example, shock absorbers, springs, torsion bars and other devices might be added to enhance the vehicle's suspension. The appended claims should therefore be construed to include all of those equivalent embodiments within the spirit and scope thereof.

What is claimed:

1. A pedaled vehicle comprising:
   a) a framework supporting a plurality of wheels, wherein an enclosed housing supports a fork at one end and an axle housing at an opposite end, wherein a first wheel is supported to the fork, and wherein second and third wheels are supported to first and second axles mounted in said axle housing;
   b) pedal means having pedals for deriving vehicle power from rotation of the pedals;
   c) transmission means coupled to said pedal means for coupling a rotational input motion at a selected one of a plurality of gear ratios to an output shaft;
   d) differential means coupled to said output shaft and to each of said first and second axles for rotating said first and second axles in unison when said vehicle travels in a straight line and at different rates of rotation during turns, comprising
      i) a first annular sprocket having a plurality of teeth projecting from an outer circumference;
      ii) a yoke having first, second, third and fourth arms which extend at ninety degrees to each adjacent arm and wherein said first and second arms are mounted to an inner periphery of said first sprocket, wherein said third and fourth arms extend transverse to a plane containing said first sprocket and said first and second arms, and wherein said first and second axles are coupled to said third and fourth arms;
      iii) a plurality of mitered gears mounted to said first, second, third and fourth arms and wherein each of said gears mesh with a gear mounted to each adjacent arm of said yoke, whereby said first and second axles rotate at different rates during turns;
   e) means for steering said vehicle; and
   f) seat means for supporting a user to access said pedals.

2. A vehicle as set forth in claim 1 wherein the mitered gears mounted to said third and fourth arms include a stub axle and wherein coupler means secure the stub axle of said third and fourth gears to said first and second axles.

3. A vehicle as set forth in claim 1 wherein said wheels comprise a plastic rim having a plurality of plastic spokes radiating from a hub having a hexagon bore and supporting non-pneumatic tires exhibiting a tread width in the range of 2½ to 3½ inches.

4. A vehicle as set forth in claim 1 including brake means for stopping the vehicle comprising a) hand brake means having a cable trained between a steering handle and brake pads mounted to engage the first wheel and b) foot brake means mounted to said transmission means and responsive to reverse rotation of said pedals.

5. A vehicle as set forth in claim 1 wherein said seat means comprises a cradle mounted to a rail that extends along said enclosed housing, and a second framework secured to said cradle and a sling contained to said second framework.

6. A vehicle as set forth in claim 1 wherein first and second fender frameworks mount to said axle housing and support fabric fenders about said rear wheels.

7. A vehicle as set forth in claim 1 including a head tube at said framework which supports said fork, wherein a retainer cup mounts in said head tube and supports a bearing having a bore, wherein a sleeve bushing is supported in said bore with first and second snap rings and threaded to a sleeve nut which covers an end of said head tube, and wherein a yoke collar mounts to said sleeve nut and a steering handle is secured to said yoke collar, whereby said yoke collar can be detached from said head tube without removing said bearing.

8. A vehicle as set forth in claim 1 wherein said framework comprises a plurality of panels welded to form said enclosed housing, wherein panels are removeably secured to said housing to access said transmission means and said pedal means, wherein a head tube is secured to a fore end and wherein said axle housing projects from a differential housing secured to an aft end.

9. A pedaled vehicle comprising:

a) a framework supporting a plurality of wheels, wherein an enclosed housing supports a fork at one end and an axle housing at an opposite end, wherein a first wheel is supported to the fork, and wherein second and third wheels are supported to first and second axles mounted in said axle housing;

b) pedal means having first and second pedals mounted to a crank arm at said housing for deriving vehicle power from rotation of the pedals;

c) a chain coupling said pedal means to transmission means for coupling a rotational input motion at a selected one of a plurality of gear ratios to an output shaft;

d) a belt coupling said output shaft to differential means and to each of said first and second axles for rotating said first and second axles in unison when said vehicle travels in a straight line and at different rates of rotation during turns, comprising;
  i) a first annular sprocket having a plurality of teeth projecting from an outer circumference and mating to said belt,
  ii) a yoke having first, second, third and fourth arms which extend at ninety degrees to each adjacent arm and wherein said first and second arms are mounted to an inner periphery of said first sprocket, wherein said third and fourth arms extend transverse to a plane containing said first sprocket and said first and second arms, and wherein said first and second axles are coupled to said third and fourth arms,
  iii) a plurality of mitered gears mounted to said first, second, third and fourth arms and wherein each of said gears mesh with a gear mounted to each adjacent arm of said yoke, whereby said first and second axles rotate at different rates during turns;

e) means for braking said wheels;

f) means for steering said vehicle; and g) seat means for supporting a user to access said pedals.

10. A vehicle as set forth in claim 9 including a head tube at said enclosed housing which supports said fork, wherein a retainer cup mounts in said head tube and supports a bearing having a bore, wherein a sleeve bushing is supported in said bore with first and second snap rings and threaded to a sleeve nut which covers an end of said head tube, and wherein a yoke collar mounts to said sleeve nut and a steering handle is secured to said yoke collar, whereby said yoke collar can be detached from said head tube without removing said bearing.

11. A vehicle as set forth in claim 9 wherein said wheels comprise a plastic rim having a plurality of plastic spokes which radiate from a hub having a hexagon bore and supporting a non-pneumatic tire exhibiting a tire width in the range of 2½ to 3½ inches.

12. A vehicle as set forth in claim 9 wherein said seat means includes cradle means for supporting a second framework and a sling seat secured to the second framework to a rail which extends along said enclosed housing.

13. A pedaled vehicle comprising:

a) an enclosed housing supporting a plurality of wheels, wherein said enclosed housing includes a plurality of panels welded to one another and including panels which are removeably secured to said enclosed housing, wherein a fork extends from a head tube at one end of said enclosed housing and a differential housing and a pair of axle housings are secured to an opposite end of said enclosed housing, wherein a flanged rail extends along said enclosed housing, wherein a first wheel is supported to the fork, and wherein second and third wheels are supported to first and second axles mounted in said axle housing;

b) pedal means having first and second pedals mounted to a crank arm at said enclosed housing for deriving vehicle power from rotation of the pedals;

c) a chain coupling said pedal means to transmission means for coupling a rotational input motion at a selected one of a plurality of gear ratios to an output shaft;

d) a belt coupling said output shaft to differential means and to each of said first and second axles for rotating said first and second axles in unison when said vehicle travels in a straight line and at different rates of rotation during turns, wherein said differential means comprises;
  i) a first annular sprocket having a plurality of teeth projecting from an outer circumference and mating to said belt,
  ii) a yoke having first, second, third and fourth arms which extend at ninety degrees to each adjacent arm, wherein said first and second arms are mounted to an inner periphery of said first sprocket, wherein said third and fourth arms extend transverse to a plane containing said first sprocket and said first and second arms, and wherein said first and second axles are coupled to said third and fourth arms,
  iii) a plurality of mitered gears mounted to said first, second, third and fourth arms, wherein each of said gears mesh with a gear mounted to each adjacent arm of said yoke, wherein the mitered gears mounted to said third and fourth arms include a stub axle and wherein coupler means secure the stub axle of said third and fourth arms to said first and second axles;

e) means for braking said wheels;

f) means for steering said vehicle; and g) seat means for supporting a user to access said pedals.

14. A vehicle as set forth in claim 13 wherein said wheels comprise a plastic rim having a plurality of plastic spokes which radiate from a hub having a hexagon bore and supporting a non-pneumatic tire exhibiting a tire width in the range of 2½ to 3½ inches.

15. A vehicle as set forth in claim 13 wherein said brake means includes hand brake means coupled to brake pads that engage the first wheel and foot brake means mounted to said transmission means and responsive to reverse rotation of said pedals.

16. A vehicle as set forth in claim 13 wherein said seat means comprises a cradle mounted for reciprocating movement along a rail at said enclosed housing, and a second framework secured to said cradle and a sling seat contained to said second framework.

17. A vehicle as set forth in claim 13 wherein said head tube contains a retainer cup that supports a bearing having a bore, wherein a sleeve bushing is supported in said bore and threaded to a sleeve nut which covers an end of said head tube, and wherein a yoke collar mounts to said sleeve nut and a steering handle is secured to said yoke collar, whereby said yoke collar can be detached from said head tube without removing said bearing.

* * * * *